United States Patent Office 3,277,062
Patented Oct. 4, 1966

3,277,062
PROCESS FOR THE PRODUCTION OF ALKYD RESINS CONTAINING ALIPHATIC AND AROMATIC DICARBOXYLIC ACIDS
Johan M. Goppel, Nantko Kloos, and William J. Van Westrenen, Amsterdam, Netherlands, assignors to Shell Oil Company, New York, N.Y., a corporation of Delaware
No Drawing. Filed July 6, 1961, Ser. No. 122,077
Claims priority, application Netherlands, July 13, 1960, 253,722
8 Claims. (Cl. 260—78.4)

The present invention relates to a novel process for preparing alkyd resins modified with monocarboxylic resins, and more particularly the invention relates to alkyd resins obtained by reacting esters of monocarboxylic acids containing an epoxy group in the alcoholic part of the ester or molecule with polybasic carboxylic acids or anhydrides thereof.

The above-mentioned esters are of greatly varying types both as regards the alcoholic part of the ester molecule and the monocarboxylic acid from which they are derived. However, the ester linkage represents a weak point and thus reduces its stability. Therefore, although it is possible to utilize a wide variety of fatty acids by incorporating them into the completed alkyd resin, the disadvantage of stability has been present together with the advantages of desired oil length, increased flexibility, and the like. It has been found that increased stability is obtained when alpha-alkyl- carboxylic acids are utilized and that particularly stable ester linkages are obtained with alpha-alpha-dialkyl carboxylic acids. This development is disclosed and claimed in the copending United States application Serial No. 29,165, filed May 16, 1960, by Nantko Kloos.

While the above application provides highly desirable alkyd resins of improved stability, it has been found that dicarboxylic acids based on aromatic compounds such as phthalic acid tend to be somewhat lower in impact than is desired for some purposes, and the present invention provides alkyd resins with the advantage of improved impact strength thereover.

An improvement in the said process has now been found as a result of which products are obtained having a high impact strength, while the chemical resistance and a sufficient hardness are retained.

This improvement is attained by a very special choice of the polybasic carboxylic acids. According to the invention use is made of dicarboxylic acids or mixtures of dicarboxylic acids (if desired entirely or partly in the form of their anhydrides) which contain aromatic nuclei as well as carboxyl groups bound to aliphatic carbon atoms, the molar ratio of the number of carboxyl groups bound to aliphatic carbon atoms to the number of aromatic nuclei being in the range of from 0.1 to 4.

At values below 0.1 the coatings obtained with these alkyd resins are generally very hard; at values between 0.1 and 4 both the hardness and impact strength of the coating are generally high, and at values above 4 there is usually a rapid decrease in hardness.

A great variation is possible in the manner in which the aromatic nuclei are bound in the dicarboxylic acids. The carbon atoms of these nuclei may be directly bound to carboxyl groups or else they may be indirectly bound, for example, by means of one or more aliphatic carbon atoms. The aromatic nuclei may occur in the same molecule as the aliphatic carboxyl groups, but they may also be present in other molecules.

The carboxyl groups directly bound to aromatic nuclei as in phthalic anhydride, are not included in the definition of the invention given above and in claim 1. They are, of course, important for calculating the total quantity of dicarboxylic acid reacted with the epoxy alkyl esters and polyhydroxy compounds.

The preparation of alkyd resins from epoxy alkyl esters of alkyl carboxylic acids has many advantages over other processes in which polyhydroxy compounds are used as starting materials. The reaction is rapid and starts even at relatively low temperatures. If the starting materials are glycidyl esters and a small quantity of glycerol is also present, the alkyd formation generally begins even at approximately 130° C., and a reaction period of 1–2 hours is generally sufficient at approximately 230° C. Difficulties caused by gelling of the reaction mixture, as occur in the conventional processes, are avoided when operating according to the invention.

The proportions of total polybasic carboxylic acid used will be related to the hydroxyl content with the epoxy ester considered as hydroxyl for this purpose, and added glycerine or the like is also included. Thus the ratio of acid to base will be such that there will be from about 1 to about 1.3 hydroxyl groups per carboxylic acid group. Stated another way, the equivalent weight of the hydroxyl or alcohol components will be from about 1 to about 1.3 times the equivalent weight of the carboxylic acid components.

The novel alkyd resins have excellent chemical and mechanical properties and are moreover light in color. They are therefore preeminently suitable for use as base for lacquers and varnishes. Lacquers and varnishes manufactured from these alkyd resins are highly resistant to the action of various chemicals. They are hard but at the same time flexible and give layers with good adherence which can be less readily damaged than layers manufactured from alkyd resins of different origin.

As indicated above, the chemical resistance is particularly high when epoxy esters of alpha-alpha-dialkyl monocarboxylic acids are used as starting material in the preparation. In this case, the color stability is also noticeable both when exposed to light and to heat.

The epoxy esters which are preferably used in the present invention may be characterized by the following formula:

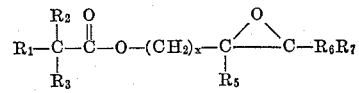

in which $R_1$ and $R_2$ are alkyl groups, $R_3$, $R_5$, $R_6$ and $R_7$ are members of the class consisting of hydrogen and alkyl groups, the groups $R_1$, $R_2$ and $R_3$ contain a sum total of from 3 to 18 carbon atoms, $R_5$, $R_6$ and $R_7$ contain a total of from 0 to 18 carbon atoms and $x$ is an integer from 0 to 6.

In general, the alcoholic parts of the ester molecule may be any one of the group fitting within the formula defined above. Most preferably, $x$ is 1 so that a 2,3-epoxy radical is utilized such as 2,3-epoxy butyl, 2,3-epoxy hexyl, 2,3-epoxy-4-phenyl octyl, 2-ethyl-2,3- epoxy hexyl, 2,3-epoxy-4,5-diethyl dodecyl and epoxy cyclohexyl. The nature of the carbon skeleton of the epoxy alkyl group affects the properties of the alkyd resins. Long carbon chains, for example, increase the flexibility of these resins. As will be explained further below, the most preferred component is the glycidyl esters.

The monocarboxylic acids used to make the epoxy esters are generally aliphatic monocarboxylic acids, particularly those having at least 4 and not more than 20 carbon atoms in the molecule are important. Cycloaliphatic or aromatic monocarboxylic acids may also be used. The important characteristic is that the acids have secondary or tertiary carboxyl groups.

Preferably these acids are obtained by reacting with carbon monoxide and water olefins having at least 3 carbon atoms in the molecule. This reaction takes place under the influence of acid catalysts, for example, phosphoric acid, sulfuric acid and complexes of phosphoric acid with boron fluoride. The reaction is more thoroughly described in the copending patent application of Marinus J. Waale and Johan M. Vox, Serial No. 858,609, filed December 10, 1959, now Patent No. 3,059,004. As indicated in this application the carboxyl group adds on at the double bond and even when the double bond is terminal, the addition is such that a strong tendency for tertiary groups to be formed by isomerization is noted. Branching at the double bond also provides a tertiary carboxyl group. Very attractive products are obtained when mono-olefins having at least 8 and not more than 18 carbon atoms in the molecule are thus converted into monocarboxylic acids and subsequently via the epoxy alkyl esters of these acids into alkyd resins. Preferably, more than 10% of the monocarboxylic acids will be tertiary in the carboxyl group.

The epoxy alkyl esters of the above monocarboxylic acids may be prepared in any of the known ways for obtaining epoxy esters from monocarboxylic acids. A preferred method for preparing such esters is set forth in a copending application by Nantko Kloos and Jacques J. J. Drost, Serial No. 28,865, filed May 13, 1960, now Patent No. 3,178,451.

Briefly speaking, a monocarboxylic acid salt (for example, alkali metal salts or quaternary ammonium salt) may be reacted with epichlorohydrin. This reaction is preferably carried out by gradually adding a liquid phase consisting of epichlorohydrin or containing the later in a stream of a concentrated solution of the salt in water, or by gradually adding a concentrated solution of an alkali metal hydroxide to a liquid phase containing both epichlorohydrin and a monocarboxylic acid. The water supplied and any water formed during the reaction may be removed by azeotropic distillation. According to another process, a dry salt of a carboxylic acid is suspended in a liquid phase consisting of or containing epichlorohydrin. Tertiary amines and quaternary ammonium salts may act as catalysts in this reaction.

Monocarboxylic acid may also be reacted as such with epichlorohydrin with the use of nitrogen bases or salts thereof as catalysts. When monocarboxylic acids and epichlorohydrin are used in a stoichiometric ratio, or when an excess of dicarboxylic acid is used, a chlorohydrin is formed from which a glycidyl ester may be produced by treating with alkaline substances such as alkali metal hydroxides. If epichlorohydrin is reacted with a monocarboxylic acid in a mole ratio of at least 2:1, the glycidyl ester is immediately formed. In this case the preferred catalysts are tertiary amines and quaternary ammonium salts.

Monocarboxylic acid salts may also be reacted with chlorohydrin. An ester is then obtained from which the desired glycidyl ester may be formed by treating with an alkaline substance. Homologues and corresponding bromine compounds may be used in the described processes instead of epichlorohydrin and chlorohydrin.

The alkyd resins are obtained by reacting the epoxy alkyl esters of alpha-alkyl monocarboxylic acids with polybasic carboxylic acids or anhydrides thereof. As indicated above, it is a necessary feature of this invention that the polybasic carboxylic acids contain a certain number of aromatic nuclei and a number of carboxylic groups bound to aliphatic carbon atoms. It is also necessary that the ratio of such carboxyl groups bound to aliphatic carbon atoms be from 0.1–4 times the number of aromatic nuclei.

Examples of very suitable dicarboxylic acids (or anhydrides thereof) and mixtures thereof within the scope of the invention are aralkyl succinic acid by itself or together with phthalic anhydride, alkyl or alkenyl succinic acids together with phthalic anyhyride, and adipic acid together with phthalic anhydride or terephthalic acid.

According to the invention particularly good resins are obtained by starting from xylyl succinic acid or from an alkenyl succinic acid having from 14 to 18 carbon atoms in the alkenyl group. Other examples are benzyl, cumyl, 1-phenyl ethyl succinic acid and the acids obtained by reacting terpenes with maleic anhydride.

Substituted succinic acids may be obtained by reacting a hydrocarbon with maleic anhydride. For the preparation of aralkyl succinic acids reference is made to The Journal of the American Oil Chemists' Society 25 (1948), pp. 251–254, and for the preparation of alkenyl succinic acids to the German patent specification 710,949.

Other suitable mixtures of dicarboxylic acids are mixtures of succinic acid, adipic acid, diglycolic acid, thiodiglycolic acid and cyclohexane dicarboxylic acid with phthalic anhydride, isophthalic anhydride or terephthalic anhydride.

In the preparation of the alkyd, it has also been found desirable to add a limited quantity of monocarboxylic acid which is allowed to react simultaneously in the reaction of the epoxy alkyl esters with the polybasic carboxylic acids or anhydrides thereof.

The process according to the invention may be accelerated by various catalysts. Suitable catalysts are generally Lewis bases such as hydroxy compounds including monohydric alcohols, glycols and glycerol, primary, secondary and tertiary amines, acid amides including urea and acetamide, mercaptans, dialkyl sulphides and sulphoxides; if epoxy alkyl esters are reacted with polybasic carboxylic acid anhydrides, acids may also act as catalysts. The catalyst is generally used in a quantity of 0.1 to 10% by weight, based on the whole reaction mixture.

To ensure that the alkyd resins have the lightest possible color, it is advisable to carry out the reaction of the epoxy alkyl esters with the polybasic carboxylic acids or anhydrides thereof in an oxygen-free atmosphere.

The alkyd resins of the invention are suitable to be worked up by the conventional methods to paints, lacquers and varnishes. Components such as pigments, diluents, phenol formaldehyde, urea formaldehyde and malamine resins being added to provide the desired paint.

In order to better illustrate the invention, the following specific examples are given:

EXAMPLE I

The acids branched at the alpha position were made from alkenes having from 8 to 10 carbon atoms in the molecule. These alkenes were obtained as a fraction of a product formed in the thermal vapor-phase cracking of a paraffinic feedstock in the presence of steam. The dienes originally present in this fraction were converted into monoolefins by partial hydrogenation. The alkenes were substantially unbranched, and the double bonds were present almost exclusively between the non-terminal carbon atoms.

The alkenes were converted with carbon monoxide and water into carboxylic acids, the temperature being 60° C., the carbon monoxide pressure 100 atmospheres, a catalyst being used containing $H_3PO_4$ and $BF_3$ in equimolar quantities. The crude carboxylic acids were neutralized with sodium hydroxide after being separated from the catalyst, whereupon the aqueous sodium salt solution was freed from the hydrocarbons still present by finally extracting it with gasoline.

The sodium salt solution was gradually added to a ten-fold molar quantity of epichlorohydrin, the mixture being maintained at the boiling point and water removed by azeotropic distillation. In this way, glycidyl esters of alpha-alkyl monocarboxylic acids having 9 to 11 carbon atoms were obtained.

An alkyd resin was then prepared by mixing the following ingredients in the proportions given:

140.6 g. (0.95 mole) of phthalic anhydride
7.3 g. (.05 mole) of adipic acid
28 g. of glycerol 155 g. of glycidyl esters of monocarboxylic acids branched at the alpha position prepared as given above 40 g. of xylene The mixture was kept at 240° C. in a nitrogen atmosphere while it was stirred, and the water formed was removed by azeotropic distillation. In the dicarboxylic acids for this resin the ratio between the aliphatic carboxyl groups and benzene nuclei was 0.105.

A stoving enamel produced from 70 parts of this resin, 30 parts of urea formaldehyde resin and 90 parts of titanium white was applied to thin steel panels and baked at 150 C. for 40 minutes.

On testing the resultant films the following results were obtained:

Hardness (Buchholz) _____ 111
Impact strength (lb./in.) _____ 16
Flexibility, bend-testing around a mandrel having a
  diameter of _____inch__ 1/8
Erichson penetration _____mm__ 5.9
Resistance to acetic acid (vapor) _____ 10

EXAMPLE II

A resin was prepared from the following materials using the procedure of Example I.

126 g. of phthalic anhydride
22 g. of adipic acid
28 g. of glycerol
155 g. of glycidyl esters of monocarboxylic acids branched at the alpha position as prepared above.

The resin was also worked up and tested in the same manner as in Example I. In the dicarboxylic acids the ratio of aliphatic carboxyl groups to benzene nuclei was 0.353.

The following test results were obtained:

Hardness _____ 110
Impact strength (lb./in.) _____ 20
Flexibility, bend-testing around a mandrel having a
  diameter of _____inch__ 1/8
Erichson penetration _____mm__ 6.8
Resistance to acetic acid (vapor) _____ 10

EXAMPLE III

A resin was prepared from the following materials using the procedure of Example I:

111 g. of phthalic anhydride
36.5 g. of adipic acid
28 g. of glycerol
155 g. of glycidyl esters of monocarboxylic acids branched at the alpha position as prepared above.

The resin was also worked up and tested in the same manner as in Example I. In the dicarboxylic acids the ratio of aliphatic carboxyl groups to benzene nuclei was 0.67.

The following test results were obtained:

Hardness _____ 100
Impact strength (lb./in.) _____ 35
Flexibility, bend-testing around a mandrel having a
  diameter of _____inch__ 1/16
Erichson penetration _____mm__ 6.4
Resistance to acetic acid _____ 9

EXAMPLE IV

A resin was prepared from the following materials using the procedure of Example I:

104 g. phthalic anhydride
102 g. of alkenyl succinic acid having from 14 to 18 carbon atoms in the alkenyl group.
41 g. of glycerol
117 g. of glycidyl esters of monocarboxylic acids branched at the alpha position as prepared above.

The resin was also worked up and tested in the same manner as in Example I. In the dicarboxylic acids the ratio of aliphatic carboxyl groups to benzene nuclei was 0.857.

The following test results were obtained:

Hardness _____ 87
Impact strength (lb./in.) _____ 40
Flexibility, bend-testing around a mandrel having a
  diameter of _____inch__ 1/16

EXAMPLE V

A resin was prepared from the following materials, worked up and tested according to the procedure of Example I:

37 g. of phthalic anhydride
167 g. of xylyl succinic acid
41 g. of glycerol
117 g. of glycidyl esters of monocarboxylic acids branched at the alpha position as prepared above.

In the dicarboxylic acids the ratio of aliphatic carboxyl groups to benzene nuclei was 1.5.

The following test results were obtained:

Hardness _____ 118
Impact strength (lb./in.) _____ 18
Erichson penetration _____mm__ 5.8

EXAMPLE VI

A resin was prepared from the following ingredients, worked up and tested according to the procedure of Example I.

222 g. of xylyl succinic acid
41 g. of glycerol
117 g. of glycidyl esters of monocarboxylic acids branched at the alpha position as prepared above.

In the carboxylic acids the ratio of aliphatic carboxylic groups to benzene nuclei was 2.

The following test results were obtained:

Hardness _____ 100
Impact strength (lb./in.) _____ 90
Flexibility, bend-testing around a mandrel having a
  diameter of _____inch__ 1/16
Erichson penetration _____mm__ 7.6
Gloss _____ 74

The above examples illustrate that excellent properties of hardness and impact strength may be obtained by operating according to the invention. Particularly valuable in these properties is the resin prepared according to Example VI in which xylyl succinic acid is used as the polybasic acid.

The resins produced according to the novel process are very suitable for use in paints, lacquers and varnishes, and particularly for use in stoving enamels. They may be worked up by conventional methods with pigments, diluents, phenol formaldehyde resins, urea formaldehyde resins, melamine formaldehyde resins, thickeners and ether usual base materials for paints and lacquers. Coatings formulated with these alkyd resins exhibit outstanding hardness, excellent flexibility, impact strength and adhesion and have outstanding resistance to chemicals. The resins have a light color and are therefore very suitable for the manufacture of white and light-colored paints and lacquers.

We claim as our invention:

1. A method of preparing a stable alkyd resin comprising reacting (1) an epoxy ester of a monocarboxylic acid having the formula

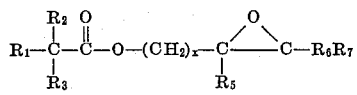

in which $R_1$ and $R_2$ are alkyl groups, $R_3$, $R_5$, $R_6$ and $R_7$ are members of the class consisting of hydrogen and alkyl groups, the groups $R_1$, $R_2$ and $R_3$ contain a total of from 3 to 18 carbon atoms, $R_5$, $R_6$ and $R_7$ contain a total of from 0 to 18 carbon atoms and $x$ is an integer from 0 to 6, (2) glycerol and (3) at least one polybasic carboxylic compound of the class consisting of polycarboxylic acids and polycarboxylic acid anhydrides and wherein at least one of said polybasic carboxylic compounds contains at least one aromatic nuclei and characterized by having the ratio of the number of carboxyl groups bound to aliphatic carbon atoms from 0.1 to 4 times the number of aromatic nuclei, and wherein the equivalent weight of the hydroxyl components is from about 1 to about 1.3 times the equivalent weight of the carboxylic acid components, with the epoxy considered hydroxyl.

2. The process defined in claim 1 in which the polybasic carboxylic compound in a mixture of adipic acid and phthalic anhydride.

3. The method defined in claim 1 in which the polybasic carboxylic compound comprises succinic acid having an aliphatic substituent and phthalic anhydride.

4. The method defined in claim 1 in which the polybasic carboxylic compound consists essentially of xylyl succinic acid.

5. A method of preparing a stable alkyd resin comprising reacting (1) epoxy esters of monocarboxylic acids having the formula

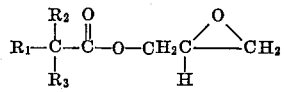

in which $R_1$ and $R_2$ are alkyl groups, $R_3$ is a member of the class consisting of hydrogen and alkyl groups and the groups $R_1$, $R_2$ and $R_3$ contain a total of from 3 to 18 carbon atoms, (2) glycerol and (3) a polybasic carboxylic acid comprising succinic acids having an aromatic substituent and having the ratio of the number of carboxyl groups bound to aliphatic carbon atoms from 0.1 to 4 times the number of aromatic nuclei, and wherein the equivalent weight of the hydroxyl components is from about 1 to about 1.3 times the equivalent weight of the caboxylic acid components, with the epoxy considered hydroxyl.

6. The method defined in claim 5 in which the polybasic carboxylic acid is xylyl succinic acid.

7. The method defined in claim 6 in which the polybasic carboxylic acid comprises succinic acids having aromatic substituents, together with phthalic anhydride.

8. A method of preparing a stable alkyd resin comprising reacting a glycidyl ester of alpha-alkyl monocarboxylic acids having 9 to 11 carbon atoms, glycerol and xylyl succinic acid, and wherein the ratio of the glycidyl ester and glycerol to the xylyl succinic acid is such that there is from 1 to 1.3 hydroxyl groups per carboxylic acid group, with the epoxy considered hydroxyl.

References Cited by the Examiner

UNITED STATES PATENTS 2,966,479  12/1960  Fischer _____ 260—78.4

FOREIGN PATENTS 839,238  6/1960  Great Britain.

JOSEPH L. SCHOFER, *Primary Examiner.*

MORRIS LIBERMAN, *Examiner.*

L. WOLF, *Assistant Examiner.*